US012637297B2

(12) United States Patent
Ryan et al.

(10) Patent No.: US 12,637,297 B2
(45) Date of Patent: May 26, 2026

(54) ROBOTIC SINGULATION SYSTEM WITH AUTOMATED VISUAL INDICATION FOR HUMAN INTERVENTION

(71) Applicant: Dexterity, Inc., Redwood City, CA (US)

(72) Inventors: Timothy Ryan, San Francisco, CA (US); David Leo Tondreau, III, San Francisco, CA (US); Harsh Vardhan, Fremont, CA (US)

(73) Assignee: Dexterity, Inc., Redwood City, CA (US)

( * ) Notice: Subject to any disclaimer, the term of this patent is extended or adjusted under 35 U.S.C. 154(b) by 482 days.

(21) Appl. No.: 18/125,030

(22) Filed: Mar. 22, 2023

(65) Prior Publication Data

US 2023/0322497 A1 Oct. 12, 2023

Related U.S. Application Data

(60) Provisional application No. 63/322,882, filed on Mar. 23, 2022.

(51) Int. Cl.
*G05B 19/418* (2006.01)
*B65G 43/02* (2006.01)

(52) U.S. Cl.
CPC .................................... *B65G 43/02* (2013.01)

(58) Field of Classification Search
CPC ... B65G 43/02; B07C 5/02; B07C 2501/0063; B07C 5/36; G05B 19/4183; G05B 19/4189; G05B 2219/39102; G05B 2219/45047; B25J 9/1674
See application file for complete search history.

(56) References Cited

U.S. PATENT DOCUMENTS

| | | | | |
|---|---|---|---|---|
| 10,954,081 B1 * | 3/2021 | Sun | ..................... | G05B 19/4182 |
| 2009/0145967 A1 * | 6/2009 | Carpenter | ........ | G07B 17/00661 |
| | | | | 235/385 |
| 2018/0127219 A1 | 5/2018 | Wagner | | |
| 2018/0141754 A1 * | 5/2018 | Garrett | .................. | B65G 47/52 |
| 2020/0047218 A1 | 2/2020 | Cherry | | |
| 2020/0130951 A1 * | 4/2020 | Wagner | .................. | B65G 43/10 |

FOREIGN PATENT DOCUMENTS

| | | | |
|---|---|---|---|
| JP | 2001233420 A | * | 8/2001 |
| WO | 2020142385 | | 7/2020 |
| WO | 2021080678 | | 4/2021 |

* cited by examiner

*Primary Examiner* — Justin Holmes
(74) *Attorney, Agent, or Firm* — Van Pelt, Yi & James LLP

(57) ABSTRACT

A robotic singulation system that provides an automated visual indication for human intervention is disclosed. In various embodiments, the system includes a communication interface; and a processor coupled to the communication interface and configured to: receive via the communication interface an indication of an error with respect to a receptacle comprising a conveyance structure; and in response to the indication, cause a visual indication to be provided with respect to the receptacle as it is moved through a workspace by the conveyance structure.

16 Claims, 7 Drawing Sheets

200 ⌐

300

406

Start

Receive user (or sensor) input
associated with bin/segment
with respect to which error
handling identification is active — 502

Determine based on user (or
sensor) input that the error/
exception is resolved — 504

Provide indication that the error/
exception is resolved — 506

End

ROBOTIC SINGULATION SYSTEM WITH AUTOMATED VISUAL INDICATION FOR HUMAN INTERVENTION

CROSS REFERENCE TO OTHER APPLICATIONS

This application claims priority to U.S. Provisional patent application No. 63/322,882 entitled ROBOTIC SINGULATION SYSTEM WITH AUTOMATED VISUAL INDICATION FOR HUMAN INTERVENTION filed Mar. 23, 2022, which is incorporated herein by reference for all purposes.

BACKGROUND OF THE INVENTION

Singulation, sortation, and other parcel induction operations, referred to herein collectively as "singulation", typically involves picking packages or other items from a source chute, bin, conveyor, or other source receptacle and placing them singly in a singulation/sortation destination, such as a single segment or tray in a segmented conveyor. Information typically must be determined to enable downstream handling of each item, such as by determining a destination and/or a class of service.

Robotic systems have been provided to automate the singulation process. In some systems, cameras or other optical sensors or scanners are used to read optical codes, such as bar codes and/or QR codes, and/or to read text information, such as by performing optical character recognition (OCR) to determine information printed in human-readable form, e.g., text and/or numbers, on an item, such as a shipping label.

In some cases, optical codes may be scanned at the sortation station, e.g., by cameras in fixed positions in the workspace and/or cameras on the robotic arm end effector. In some cases, a robotic arm may move a package through a "read zone" of a set of one or more scanners, e.g., as the package is moved from a pick area to a destination tray or bin to which it is to be placed.

In some cases, human workers cooperate with the robotic system to correct mistakes. For example, if two or more packages are placed in a single tray, a human may remove one of the packages and then place it in a later tray. However, errors may occur in automated singulation that a human worker may not be able to detect. For example, in a typical system there is no way for humans to determine which packages failed to scan when passing through the barcode reader or other scanner "read zone", because a package on the output conveyor that has had its barcode read successfully may look the same as a package that failed to read as it passed through the barcode scanner or other scanner "read zone".

BRIEF DESCRIPTION OF THE DRAWINGS

Various embodiments of the invention are disclosed in the following detailed description and the accompanying drawings.

DETAILED DESCRIPTION

Figure 1A:
FIG. 1A is a diagram illustrating an embodiment of a robotic singulation system comprising a subsystem configured to indicate to a downstream human (or other robotic) worker a bin or other receptacle with respect to which intervention is required.
Figure 1A:
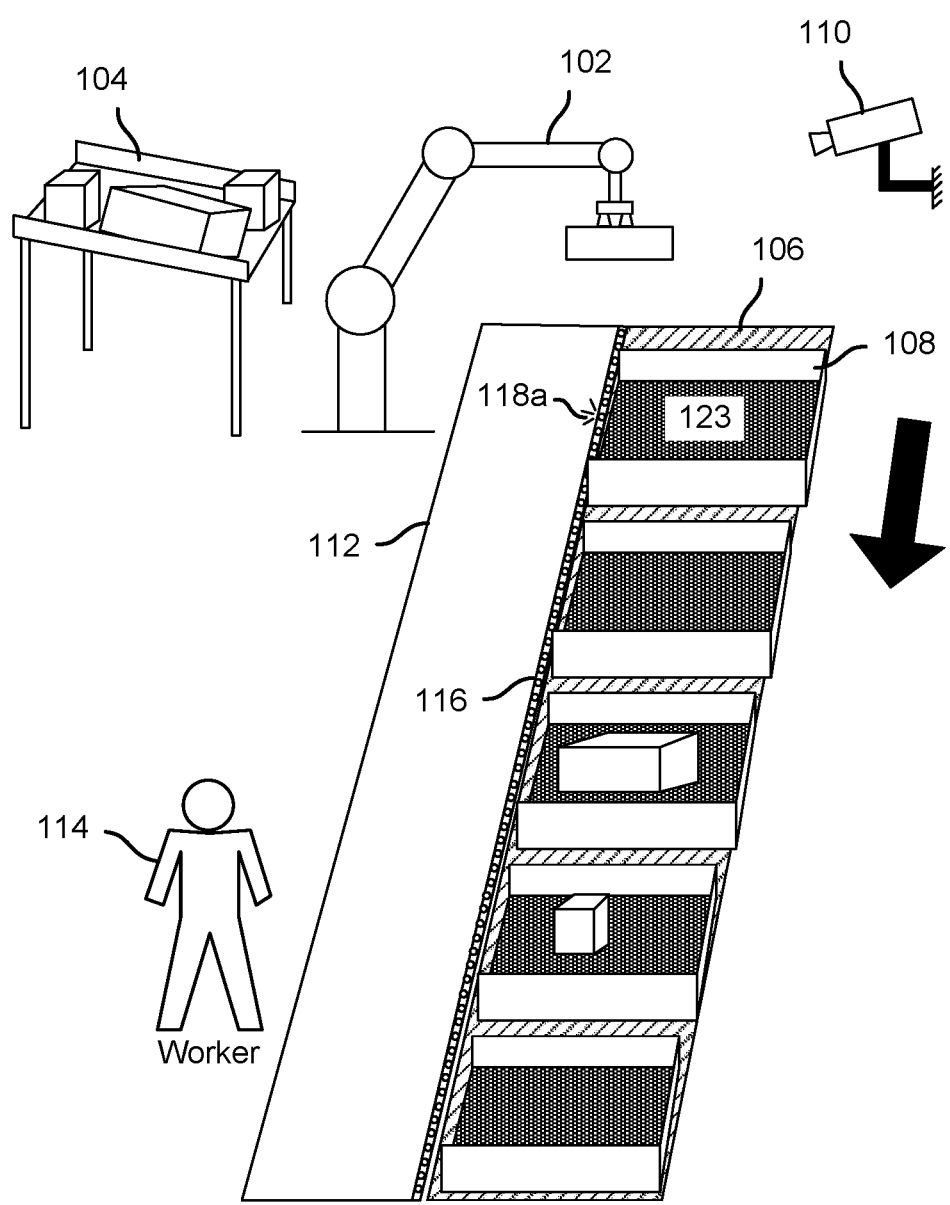

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to identify which trays, segments, or other singulation receptacles have errors or conditions that may need to be corrected by a downstream worker. In various embodiments, a visual indication is provided to indicate to a downstream human (or other robotic) worker that a package requires correction. In some embodiments, the visual indication indicates what type of corrective action is required, e.g., to unstick two or more packages, lay a polybag or other non-rigid package flat for downstream scanning, reorientate package for downstream scanning, manually scan and place in a subsequent segment or receptacle, etc.

In some embodiments, an LED or other light or visual indicator on or adjacent to the bin, tray, or other receptacle or singulation location is illuminated to indicate there is an error or issue to be corrected with respect to that bin, tray, or other receptacle. For example, an LED light on a bin or tilt tray may be activated via a wireless signal. As the bin or tray moves along the conveyor, the light provides a visual indication of the issue. Once the condition has been corrected, the light is turned off by remote/wireless signal.

In some embodiments, an LED array strip is provided on a rail strip next to a tilt tray or other type of segmented conveyor. In other embodiments, other display technologies are used. As a tilt tray or other segment advances towards downstream sortation, the LED elements adjacent to that tray are illuminated, indicating to a human worker that intervention is needed. In some embodiments, the color of the illuminated LED lights may indicate the corrective action that is required, e.g., red to reorientate package with bar code on top.

In some embodiments, overhead lights are used to create a spotlight that illuminates a package with respect to which corrective action is needed. The light follows the package as it travels towards the inductor.

In various embodiments, once the system detects that corrective action has been taken, e.g., the bar code is read, the lights are extinguished.

FIG. 1A is a diagram illustrating an embodiment of a robotic singulation system comprising a subsystem configured to indicate to a downstream human (or other robotic) worker a bin or other receptacle with respect to which intervention is required. In the example shown, system and environment 100 includes a robotic arm 102 positioned and configured to pick items from a chute, conveyor, or other source of items 104 and place them singly, each in a corresponding location on a segmented conveyor 106. Segmented conveyor 106 includes a sequence of tilt trays or other receptacles 108, including the receptacle marked "123" in FIG. 1A.

In various embodiments, images taken by one or more cameras, such as camera 110, and/or sensor data generated by one or more other sensors in the workspace may be used to determine information about items as they are placed in corresponding locations 108 on segmented conveyor 106. For example, a bar code or other optical scanner may be used to read a shipping label, to determine a destination and/or shipping class, for example. The information may be used to determine downstream handling of each item, such as which downstream conveyor, chute, bin, or other destination to which the item should be routed, e.g., by causing the tilt tray or other receptacle 108 to be actuated at a precise time associated with routing the item to its downstream destination.

In the example shown in FIG. 1A, a side table 112 is positioned alongside the segmented conveyor 106, to provide a work surface for a downstream human worker 114 to use to correct problems with respect to items placed on the segmented conveyor 106. In this example, an LED strip 116 alongside the segmented conveyor 106 provides a visual indication that human intervention is required. In various embodiments, the LED strip 116 is stationary but individual elements, e.g., LED 118a in the state shown, are illuminated so that elements adjacent to a tilt tray at any given time are illuminated as the tilt tray moves through the system. The lights enable downstream human worker 114 to see, as a tray approaches (e.g., tray "123" in this example), that human intervention is required. In some embodiments, the LED strip 116 and/or light 118a may indicated the nature of the intervention that is required, e.g., pull for manual sortation/scanning, flatten out or reorientation for downstream scanning, etc., such as by displaying a color or pattern (e.g., sequence, duration, and/or timing of flashing) associated with the nature of intervention (e.g., red to pull off the conveyor and manually scan; yellow to flatten out for downstream scanning, etc.).

Figure 1B:
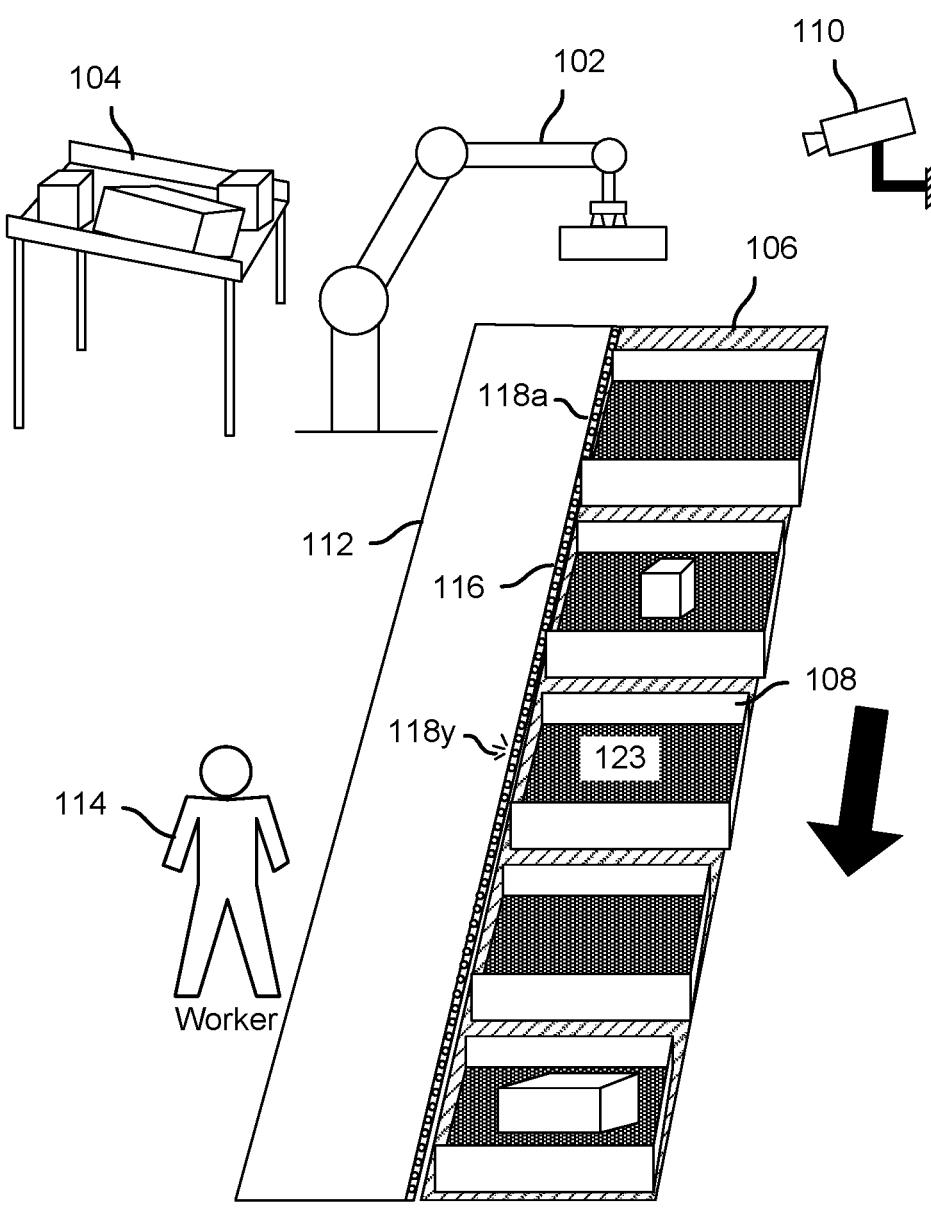
FIG. 1B is a diagram illustrating an embodiment of a robotic singulation system comprising a subsystem configured to indicate to a downstream human (or other robotic) worker a bin or other receptacle with respect to which intervention is required.

FIG. 1B is a diagram illustrating an embodiment of a robotic singulation system comprising a subsystem configured to indicate to a downstream human (or other robotic) worker a bin or other receptacle with respect to which intervention is required. In the state shown in FIG. 1B, the bin "123" (i.e., bin 108) has moved closer to the human worker 114. As the bin "123" advanced, LED lights 118 adjacent to the bin as it passed were illuminated. The LED 118a, which as illuminated when the bin "123" was adjacent to it as shown in FIG. 1A, is no longer illuminated in FIG. 1B, but the LED 118y now adjacent to the bin "123", in the state shown in FIG. 1B, is illuminated.

While in the example shown in FIGS. 1A and 1B LED lights on a stationary strip located adjacent to the segmented conveyor 106 are illuminated in sequence, as a bin requiring intervention passes, in other embodiments an LED or other visual indicator on the bin itself may be illuminated to indicate an issue requiring human or other downstream worker intervention with respect to that bin.

Figure 2A:
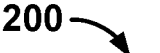
FIG. 2A is a diagram illustrating an embodiment of a robotic singulation system comprising a subsystem configured to indicate to a downstream human (or other robotic) worker a bin or other receptacle with respect to which intervention is required.
Figure 2A:
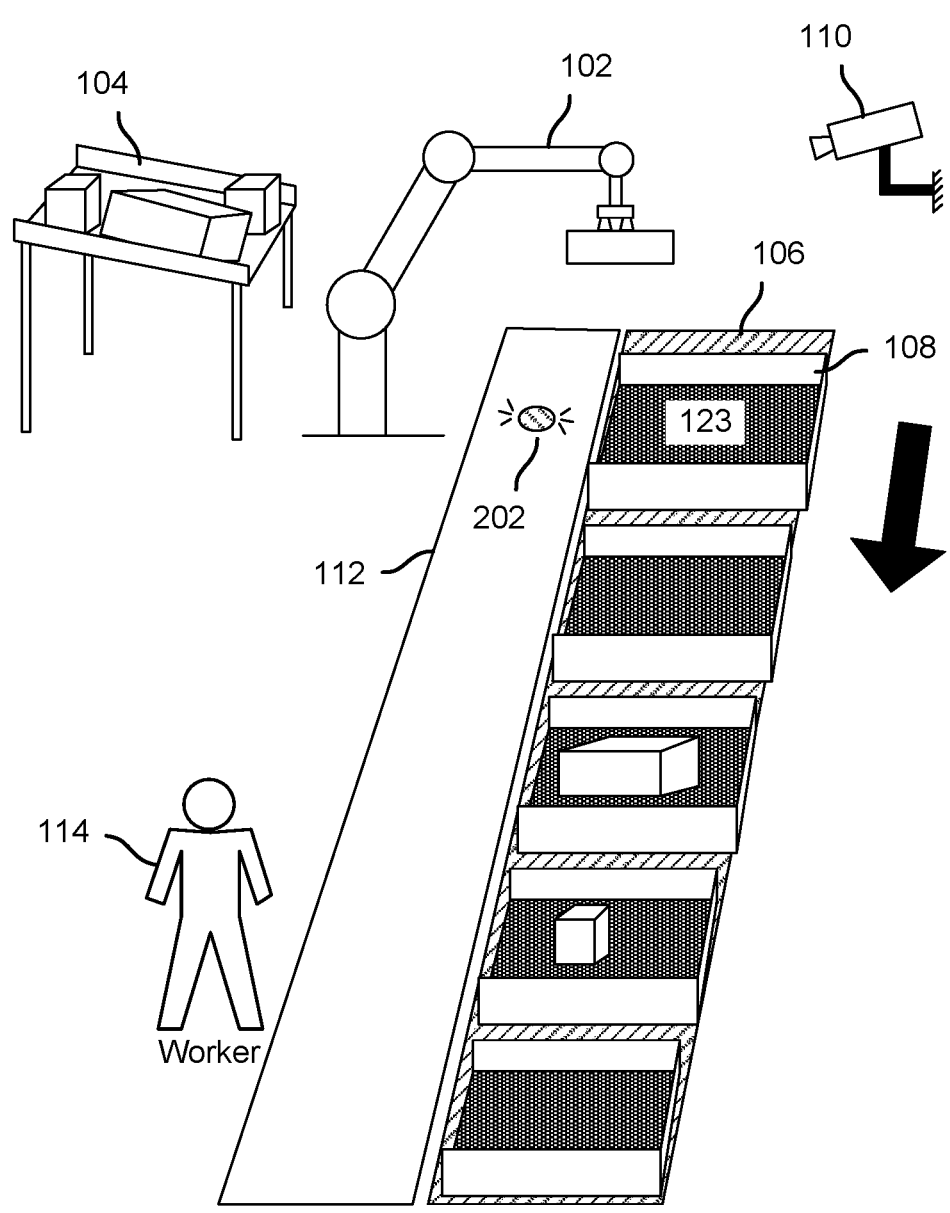

FIG. 2A is a diagram illustrating an embodiment of a robotic singulation system comprising a subsystem configured to indicate to a downstream human (or other robotic) worker a bin or other receptacle with respect to which intervention is required. In the example shown, system and environment 200 includes robotic arm 102, source of items 104, segmented conveyor 106, bin 108 (labeled "123"), camera 110, side table 112, and worker 114, as in FIGS. 1A and 1B. In addition, a spot (or other shape or design) 202 is shown as being projected onto the table 112, at a location adjacent to the bin 108 (i.e., "123") with respect to which intervention is required, e.g., by worker 114.

In various embodiments, a computer-controlled LED or other light, e.g., in the overhead, is used to project the spot or other image 202 onto table 112. A series of lights may be activated in sequence, with adjacent lights overlapping briefly, for example, to give the effect of a projected light that appears to run alongside the affected tray 108 as the segmented conveyor 106 advances. In some embodiments, the tray/bin 108 itself may be illuminated as it advances.

In various embodiments, the light(s) may be projected by stationary elements mounted in the overhead, not shown in FIG. 2A, which are activated in sequence to follow a tray 108 requiring intervention as it moves through the system.

The lights enable a downstream human worker, such as worker 114, to see, as a tray approaches, that human intervention is required, and in some embodiments the nature of the intervention, e.g., pull for manual sortation/scanning, flatten out or reorientation for downstream scanning, etc. For example, different colors and/or different symbols (circle, square, triangle, alphanumeric character, or string, etc.) may be displayed to indicate the intervention that is required.

Figure 2B:
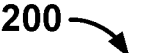
FIG. 2B is a diagram illustrating an embodiment of a robotic singulation system comprising a subsystem configured to indicate to a downstream human (or other robotic) worker a bin or other receptacle with respect to which intervention is required.
Figure 2B:
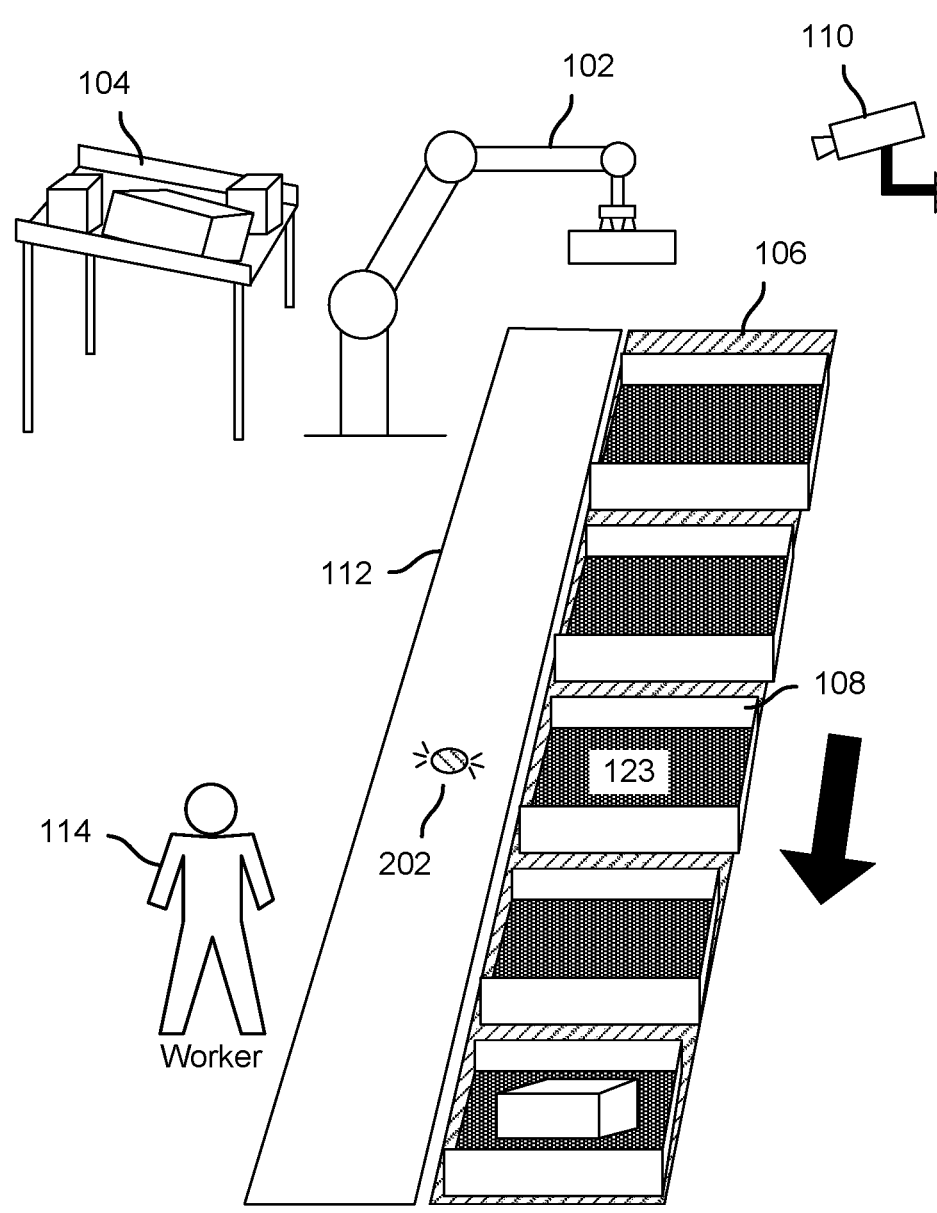

FIG. 2B is a diagram illustrating an embodiment of a robotic singulation system comprising a subsystem configured to indicate to a downstream human (or other robotic) worker a bin or other receptacle with respect to which intervention is required. In the state shown in FIG. 2B, the bin 108 ("123") has moved nearer to the worker 114, as the segmented conveyor 106 advanced, and the spot 202 has been projected onto table 112 in a manner such that the spot 202 appears to follow the affected bin 108 as it advanced toward the worker 114.

Once the issue with the affected bin 108 has been resolved, e.g., by the worker 114, the system discontinues projecting the spot (or other shape or content) 202 alongside the bin 108.

Figure 3:
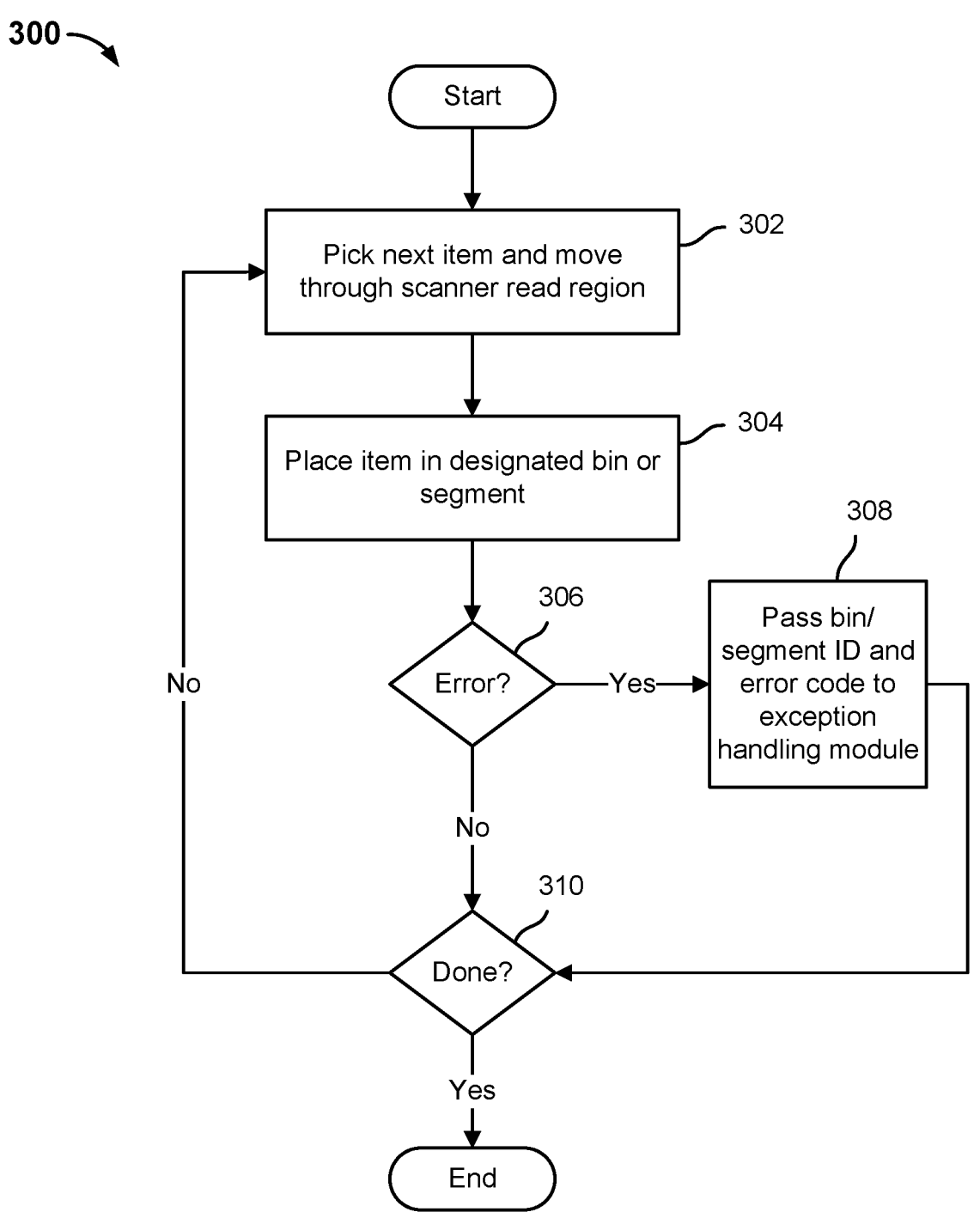
FIG. 3 is a flow diagram illustrating an embodiment of a process to perform automated singulation and invoke an exception handling module as needed.

FIG. 3 is a flow diagram illustrating an embodiment of a process to perform automated singulation and invoke an exception handling module as needed. In various embodiments, the process 300 of FIG. 3 may be performed by a control computer, such as a computer configured to control a robotic singulation system, including elements configured to provide a visual indication of a bin or receptable with respect to which intervention is required, such as those illustrated in FIGS. 1A and 1B and in FIGS. 2A and 2B.

In the example shown, at 302 a next item is picked, e.g., by robotic arm 102 from source of items 104, in the examples shown in FIGS. 1A, 1B, 2A, and 2B, and move through a scanner read region. For example, the item may be moved past an array of optical scanners and/or move through a trajectory that exposes a label to the unobstructed via of a camera, such as camera 110 in FIGS. 1A, 1B, 2A, and 2B. At 304, the item is placed in its designated bin or other receptacle. For example, the system implementing process 300 and/or a related or higher level process may select and designate a destination bin for the item, such as a specific bin having an associated identifier. As the bin passes the robotic arm (e.g., robotic arm 102), the system tracks and times placement of the item in a manner determined to achieve placement of the item in the designated bin.

At 306, it is determined whether there is an error. For example, an error may be detected if the label or other information was not scanned and decoded fully and successfully, or if by accident or error two or more items were picked and placed into the same destination bin (or other receptacle), instead of just the intended one, or if an item failed to scan (fully) and is placed in the correct bin but needs to be flattened out or otherwise adjusted to enable a downstream (e.g., overhead) scanner to be used to scan the label, etc. If an error is detected at 306, then at 308 the bin (or other destination) identifier and item information (as/if known) and (if known) an error code specifying the error (e.g., failed to fully scan, two items in one bin, item needs to be flattened out or reoriented, etc.) are passed to an exception handling module. For example, the bin identifier and error code may be passed to a software module configured to actuate, monitor, and control a set of elements configured to provide a visual indication of a bin (or other receptacle) with respect to which intervention by a downstream worker is required, as in the examples described above in connection with FIGS. 1A, 1B, 2A, and 2B.

If at 306 it is determined the item was scanned and placed successfully and singly in its destination bin, the process advances to 310. If more items need to be picked and placed, then a next iteration of steps 302, 304, and 306 is performed. If no further items requiring picking/placement, the process 300 ends.

Figure 4:
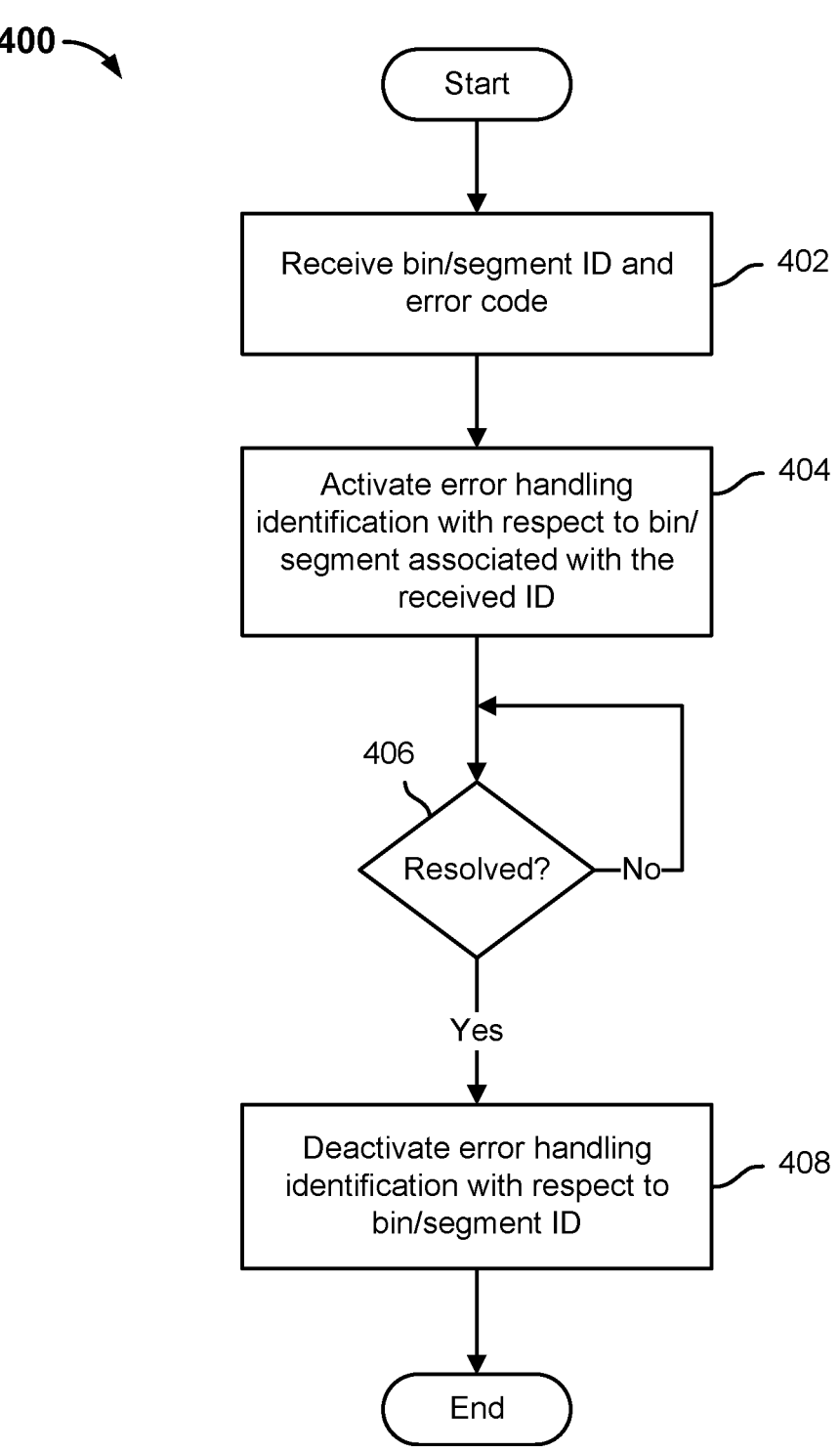
FIG. 4 is a flow diagram illustrating an embodiment of a process to provide an indication of a bin or other receptacle with respect to which intervention is required, in the context of a robotic singulation system.

FIG. 4 is a flow diagram illustrating an embodiment of a process to provide an indication of a bin or other receptacle with respect to which intervention is required, in the context of a robotic singulation system. In various embodiments, the process 400 of FIG. 4 may be implemented by a subsystem or module configured to actuate, monitor, and control a set of elements configured to provide a visual indication of a bin (or other receptacle) with respect to which intervention by a downstream worker is required, as in the examples described above in connection with FIGS. 1A, 1B, 2A, and 2B.

In the example shown, at 402 an indication is received comprising a bin/segment identifier and an associated error code indicating a nature of an error that has been detected with respect to the bin/segment with which the received bin/segment identifier is associated. In some embodiments, the indication at 402 is generated by a control computer configured to use a robotic arm to pick/place items each in a corresponding location on a segmented conveyor. In some embodiments, the computer or processor implementing the process 400 detects the error and/or determines the bin/segment identifier, e.g., based on image data generated by a camera, such as camera 110 in the examples shown in FIGS. 1A, 1B, 2A, and 2B.

At 404, error handling identification is activated with respect to the bin/segment with which the bin/segment identifier received at 402 is associated. For example, an LED strip and/or spotlight, as illustrated in FIGS. 1A and 1B and FIGS. 2A and 2B, respectively, may be controlled to display a light or other visual indication on or adjacent to the affected bin/segment as it moves through the workspace. In various embodiments, a computer vision system may be used to track the affected bin/segment as it moves through the workspace, e.g., based on a bin/segment identifier visible to the vision system, and the light and/or illumination elements are controlled dynamically, as the position of the affected bin/segment is updated, to provide a visual indication at locations adjacent to the affected bin/segment as it moves through the workspace. In some embodiments, techniques other than computer vision may be used to track the affected segment/bin as it moves through the system, such as GPS, RFID, and/or position feedback sensors comprising or otherwise associate with the segmented conveyor.

The visual indication is provided on or adjacent to the affected bin/segment until it is determined at 406 that the error condition has been resolved. For example, a human (or other worker) who resolved the issue may provide user input, via a user interface, indicating the error has been corrected. Or, a computer vision system may detect that the human worker has intervened and/or that the error condition has been corrected.

Once it has been determined at 406 that the error has been resolved, at 408 the error handling identification system and/or elements is/are deactivated, with respect to the bin/segment with which the bin/segment identifier received at 402 is associated, and the process 400 ends.

Figure 5:
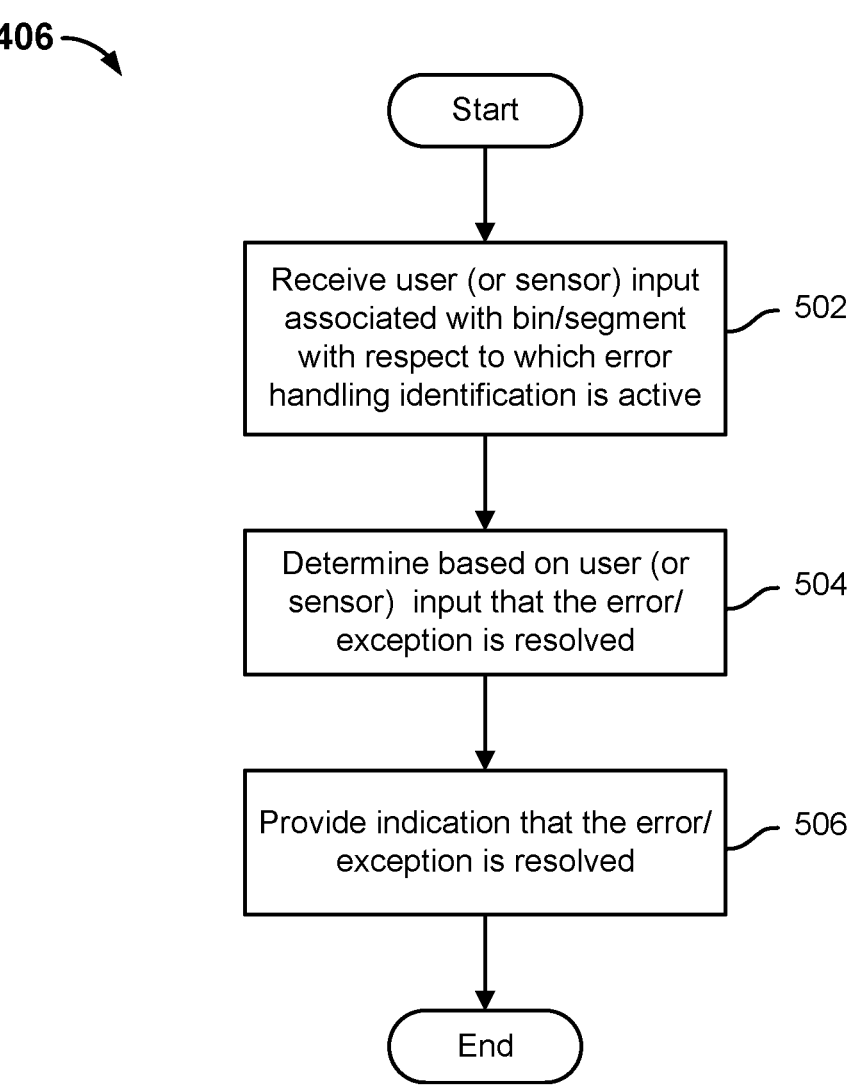
FIG. 5 is a flow diagram illustrating an embodiment of a process to detect and report that a condition requiring intervention has been resolved, in the context of a robotic singulation system.

FIG. 5 is a flow diagram illustrating an embodiment of a process to detect and report that a condition requiring intervention has been resolved, in the context of a robotic singulation system. In various embodiments, the process of FIG. 5 may be performed to implement step 406 of the process 400 of FIG. 4. In the example shown, at 502 user and/or sensor input is/are received with respect to a bin/segment with respect to which an error condition previously was associated. At 504, it is determined, based at least in part on the user and/or sensor input received at 502, that the error condition has been resolved. For example, a user may indicate explicitly via a user interface that the error was resolved, or the system may determine based on computer vision that the error condition has been resolved (e.g., the item has been flattened or reoriented such that a label is visible, a second item has been removed from the bin/segment, leaving on the intended item, etc.). At 506, an output indicating that the error has been resolved is provided. For example, an output that includes the bin/segment identifier may be communicated to another module or subsystem, such as one implementing the process 400 of FIG. 4.

In various embodiments, techniques disclosed herein may be used to provide a visual indication to a downstream worker that a given bin/segment moving through the workspace requires intervention to resolve an error.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
a processor coupled to the communication interface and configured to:
receive via the communication interface an indication of an error with respect to a receptacle comprising a conveyance structure;
in response to the indication, cause a visual indication to be provided with respect to the receptacle as it is moved through a workspace by the conveyance structure;
determine, based at least in part on image data received from a camera in the workspace, that the error has been resolved; and
deactivate the visual indication with respect to the receptacle in response to determining that the error has been resolved.

2. The system of claim 1, wherein the indication comprises image data and the processor is further configured to process the image data to detect the error.

3. The system of claim 1, wherein the error requires intervention by a downstream worker and the visual indication is visible to the downstream worker.

4. The system of claim 1, wherein the receptacle comprises a tilt tray.

5. The system of claim 1, wherein the conveyance structure comprises a segmented conveyor.

6. A system, comprising:
a communication interface; and
a processor coupled to the communication interface and configured to:
receive via the communication interface an indication of an error with respect to a receptacle comprising a conveyance structure; and
in response to the indication, cause a visual indication to be provided with respect to the receptacle as it is moved through a workspace by the conveyance structure;
wherein the receptacle comprises a location to which an item has been placed by a robotic singulation system; and
wherein the error comprises one or more of the following: the item is required to be flattened out, reoriented, or otherwise repositioned or rearranged; a second item has been placed in the receptacle along with the item and must be removed; the item was placed in the receptacle without an element of data having been determined with respect to the item.

8

7. A system, comprising:
a communication interface; and
a processor coupled to the communication interface and configured to:
receive via the communication interface an indication of an error with respect to a receptacle comprising a conveyance structure; and
in response to the indication, cause a visual indication to be provided with respect to the receptacle as it is moved through a workspace by the conveyance structure;
wherein the visual indication is provided at least in part by sequentially activating lights comprising a linear array of lights positioned adjacent to the conveyance structure, each light being activated as the receptacle passes a corresponding part of the linear array.

8. A system, comprising:
a communication interface; and
a processor coupled to the communication interface and configured to:
receive via the communication interface an indication of an error with respect to a receptacle comprising a conveyance structure; and
in response to the indication, cause a visual indication to be provided with respect to the receptacle as it is moved through a workspace by the conveyance structure;
wherein the visual indication comprises a light projected onto or adjacent to the receptacle as it is moved through the workspace by the conveyance structure.

9. The system of claim 8, wherein the visual indication is provided at least in part by sequentially activating lights comprising a set of lights positioned above the conveyance structure, each light being activated as the receptacle passes a corresponding part of the workspace.

10. A system, comprising:
a communication interface; and
a processor coupled to the communication interface and configured to:
receive via the communication interface an indication of an error with respect to a receptacle comprising a conveyance structure; and
in response to the indication, cause a visual indication to be provided with respect to the receptacle as it is moved through a workspace by the conveyance structure;
wherein an attribute of the visual indication indicates an error type of the error.

11. The system of claim 10, wherein the attribute comprises one or more of a color, a shape, and a symbolic content communicated via the visual indication.

12. The system of claim 10, wherein the attribute informs a downstream worker of an intervention required to be performed by the downstream worker.

13. A method, comprising:
receiving at a processor, via a communication interface, an indication of an error with respect to a receptacle comprising a conveyance structure; and
in response to the indication, the processor causing a visual indication to be provided with respect to the receptacle as it is moved through a workspace by the conveyance structure;
wherein the processor is further configured to determine, based at least in part on image data received from a camera in the workspace, that the error has been resolved and deactivate the visual indication with respect to the receptacle in response to determining that the error has been resolved.

14. The method of claim 13, wherein the receptacle comprises a location to which an item has been placed by a robotic singulation system.

15. The method of claim 13, wherein the error requires intervention by a downstream worker and the visual indication is visible to the downstream worker.

16. A computer program product embodied in a nontransitory computer readable medium and comprising computer instructions for:

receiving at a processor, via a communication interface, an indication of an error with respect to a receptacle comprising a conveyance structure; and in response to the indication, the processor causing a visual indication to be provided with respect to the receptacle as it is moved through a workspace by the conveyance structure;

further comprising computer instructions to determine, based at least in part on image data received from a camera in the workspace, that the error has been resolved and deactivate the visual indication with respect to the receptacle in response to determining that the error has been resolved.

* * * * *